US012507965B2

(12) United States Patent
Freschl et al.

(10) Patent No.: US 12,507,965 B2
(45) Date of Patent: Dec. 30, 2025

(54) SYSTEMS AND METHODS FOR POWER MANAGEMENT OF AN ELECTRONIC STETHOSCOPE

(71) Applicant: Eko Health, Inc., Emeryville, CA (US)

(72) Inventors: Dan Freschl, Albany, CA (US); Bryan Hord, Emeryville, CA (US); Subramaniam Venkatraman, Lafayette, CA (US); Connor Landgraf, Martinez, CA (US)

(73) Assignee: EKO DEVICES, INC., Emeryville, CA (US)

( * ) Notice: Subject to any disclaimer, the term of this patent is extended or adjusted under 35 U.S.C. 154(b) by 591 days.

(21) Appl. No.: 18/050,357

(22) Filed: Oct. 27, 2022

(65) Prior Publication Data

US 2024/0138781 A1    May 2, 2024

(51) Int. Cl.
| | | |
|---|---|---|
| *A61B 5/33* | (2021.01) | |
| *A61B 5/00* | (2006.01) | |
| *A61B 5/28* | (2021.01) | |
| *A61B 7/04* | (2006.01) | |
| *G06F 3/16* | (2006.01) | |

(52) U.S. Cl.
CPC ............ *A61B 5/748* (2013.01); *A61B 5/0006* (2013.01); *A61B 5/28* (2021.01); *A61B 5/33* (2021.01); *A61B 5/7405* (2013.01); *A61B 5/742* (2013.01); *A61B 7/04* (2013.01); *G06F 3/165* (2013.01); *A61B 2562/0204* (2013.01); *A61B 2562/0219* (2013.01)

(58) Field of Classification Search
CPC .... A61B 2560/0209; A61B 2562/0204; A61B 2562/0219; A61B 5/0006; A61B 5/28; A61B 5/33; A61B 5/7405; A61B 5/742; A61B 5/7435; A61B 5/748; A61B 7/04; G06F 3/165
See application file for complete search history.

(56) References Cited

U.S. PATENT DOCUMENTS

2004/0032957 A1* 2/2004 Mansy ..................... A61B 7/04
381/67
2008/0232604 A1* 9/2008 Dufresne ............. A61B 5/6843
381/67

FOREIGN PATENT DOCUMENTS

WO    2016116917 A1    7/2016

OTHER PUBLICATIONS

Great Britain Intellectual Property Office, Examination Report under Section 18(3) Issued in Application No. GB2316461.9, Jul. 10, 2025, 3 pages.

* cited by examiner

*Primary Examiner* — George Manuel
(74) *Attorney, Agent, or Firm* — McCoy Russell LLP (57) ABSTRACT

The present description relates generally to methods and systems for power management of a digital (e.g., electronic) stethoscope. In one example, an electronic stethoscope includes a chestpiece configured to be positioned on a patient, the chestpiece including a sensor, wherein the chestpiece further includes a computer processing unit (CPU) operatively coupled to a memory storing instructions that, when executed by the CPU, cause the CPU to automatically activate the electronic stethoscope in response to detecting a touch input via the sensor.

16 Claims, 6 Drawing Sheets

SYSTEMS AND METHODS FOR POWER MANAGEMENT OF AN ELECTRONIC STETHOSCOPE

FIELD

The present description relates generally to methods and systems for managing power in a digital stethoscope.

BACKGROUND/SUMMARY

Auscultation, the process of listening to internal sounds of a body, has historically been performed with an acoustic stethoscope. As one example, the acoustic stethoscope may include a two-sided chestpiece attached to hollow tubing that branches to two separate earpieces. A diaphragm on one side of the chestpiece may transmit high frequency sounds to the earpieces, or a bell on the other side of the chestpiece may transmit low frequency sounds to the earpieces. However, such acoustic stethoscopes are unable to digitize sounds that can be easily analyzed and shared electronically.

In contrast, an electronic (e.g., digital) stethoscope may generate digital audio data via an electronic chestpiece that may include components for noise amplification, digital display, sound recording, and wireless signal transmission. For example, the electronic stethoscope may wirelessly transmit audio data to a listening device (e.g., a pair of headphones or hearing aids) or a computing device (e.g., a smartphone or laptop computer) via a wireless connection, such as a Bluetooth® connection.

However, the inventors herein have recognized potential issues with existing electronic stethoscope systems. As one example, electronic stethoscope systems rely on mechanical power buttons, which may be physically actuated to turn the stethoscope on or off. However, stethoscopes are typically worn by clinicians for many hours a day but may only be used for short periods of time during a patient encounter. Clinicians have very limited time during patient visits and turning on and off a stethoscope via a mechanical power button can be cumbersome. As such, clinicians may leave their stethoscopes on, even when the stethoscopes are not being used, thus draining battery power faster than desired. Digital stethoscopes with batteries should stay functional for multiple days on a single charge for optimal user experience, but the reliance on mechanical power buttons may result in the stethoscopes having to be charged more frequently, or may result in a stethoscope not having power when needed for a patient encounter.

In one example, the issues described above may be addressed by an electronic stethoscope including a chestpiece configured to be positioned on a patient, the chestpiece including a sensor, wherein the chestpiece further includes a computing processing unit (CPU) operatively coupled to a memory storing instructions that, when executed by the CPU, cause the CPU to automatically activate the electronic stethoscope in response to detecting a touch input via the sensor. In this way, the power consumption and workflow of digital stethoscopes may be optimized by having the stethoscope automatically turn on and off when the sensor indicates that the device is being held or placed on a patient.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
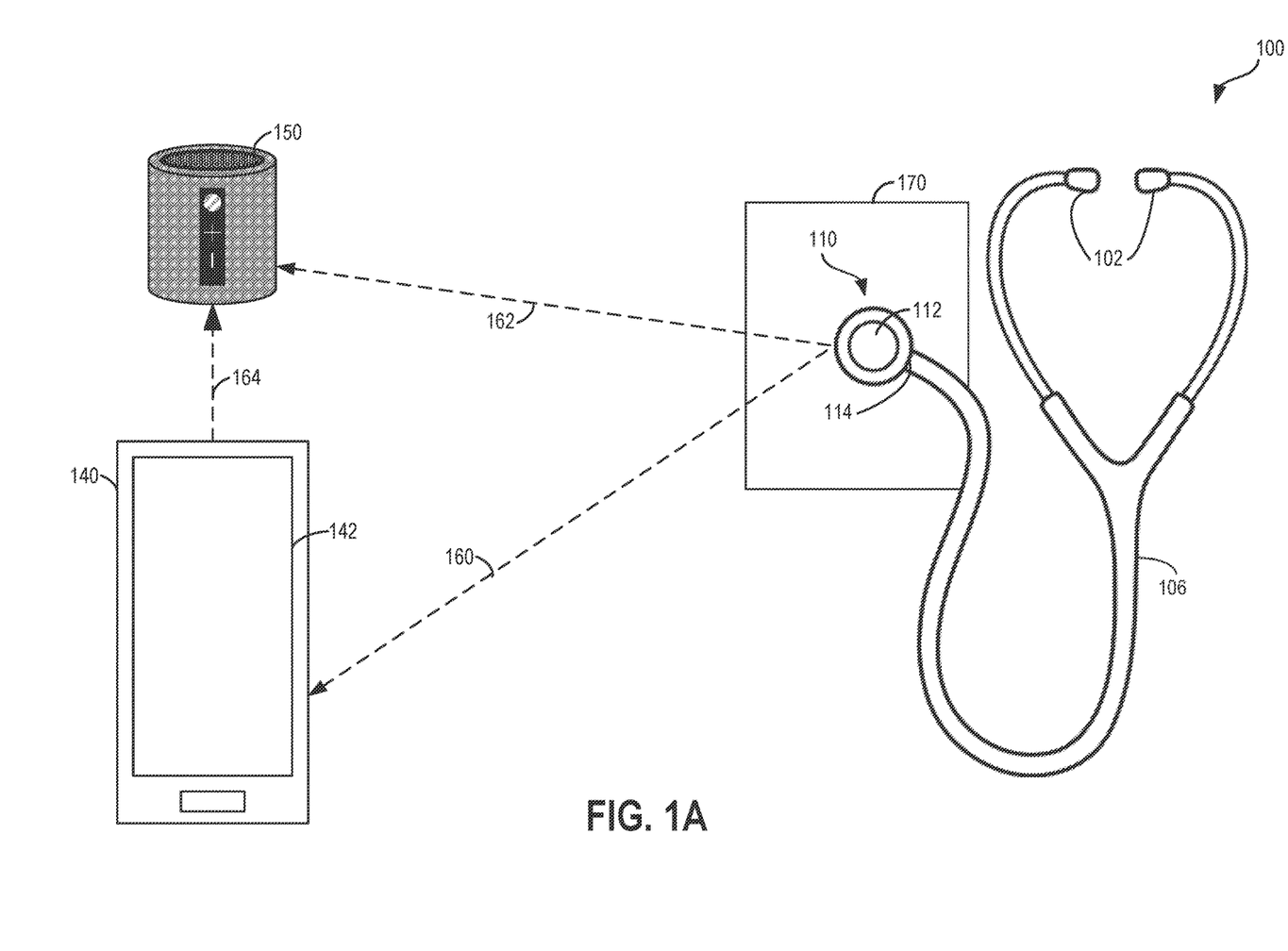
FIG. 1A is a schematic drawing showing a stethoscope in a first mechanical configuration, with earpieces connected to device chestpiece.

The present description relates generally to methods and systems for power management of a digital stethoscope. For example, the digital (e.g., electronic) stethoscope may be the electronic stethoscope shown in FIGS. 1A-1C having the chestpiece particularly shown in FIG. 1B that contains electrical components of the electronic stethoscope, including components for managing power usage of the electronic stethoscope. FIG. 1A shows a configuration of the electronic stethoscope with an output tubing and earpieces attached, while FIG. 1C shows a configuration of the electronic stethoscope without the output tubing and earpieces attached. FIGS. 2A-2C show zoomed-in views of an example chestpiece of the digital stethoscope, including a display on the chestpiece and a plurality of input devices. The plurality of input devices may include a touch sensor, an accelerometer, or microphone located on the chestpiece. Based on input received to the input device and based on detected battery charge, the digital stethoscope may be activated and/or controlled according to one or more power saving modes, according to the methods shown in FIGS. 3 and 4, for example.

Figure 1B:
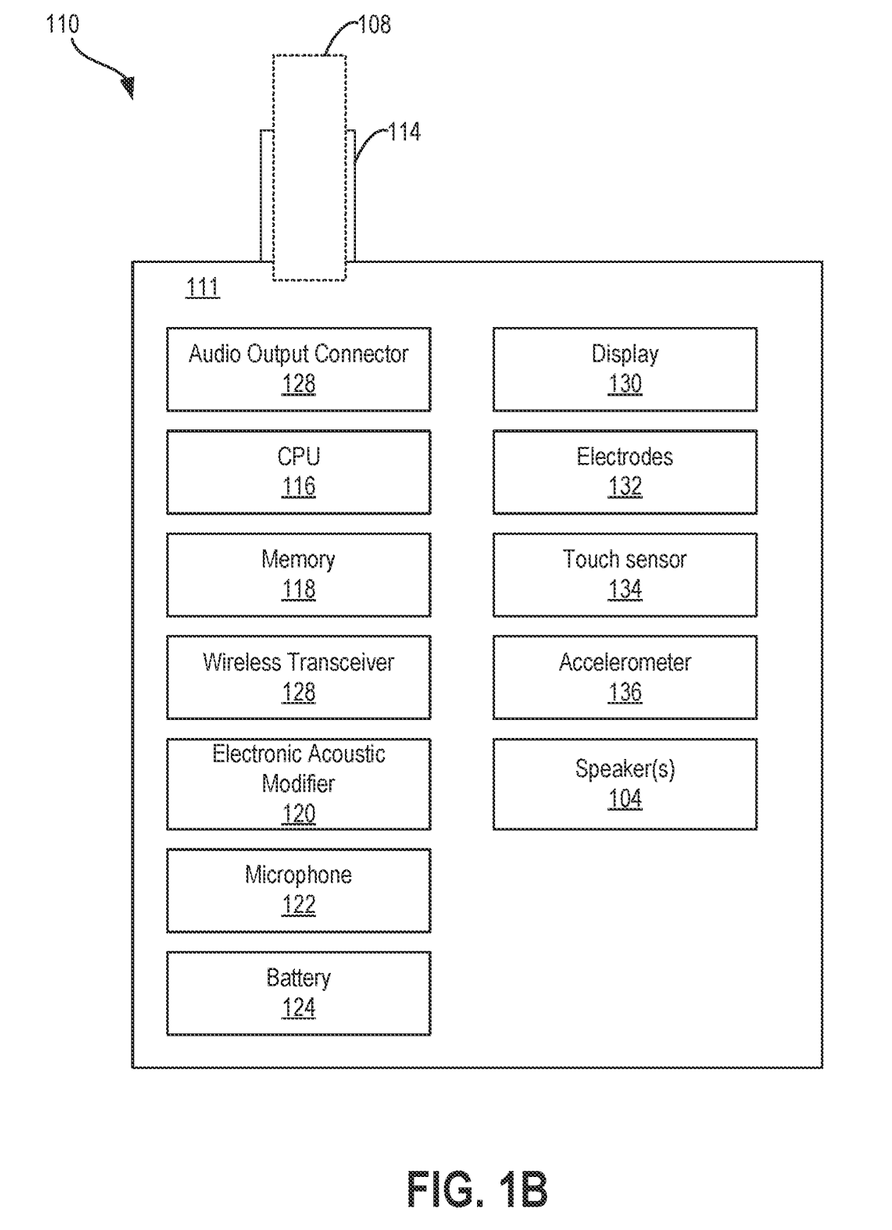
FIG. 1B is a block diagram showing the components of the chestpiece shown in FIG. 1A.
Figure 1C:
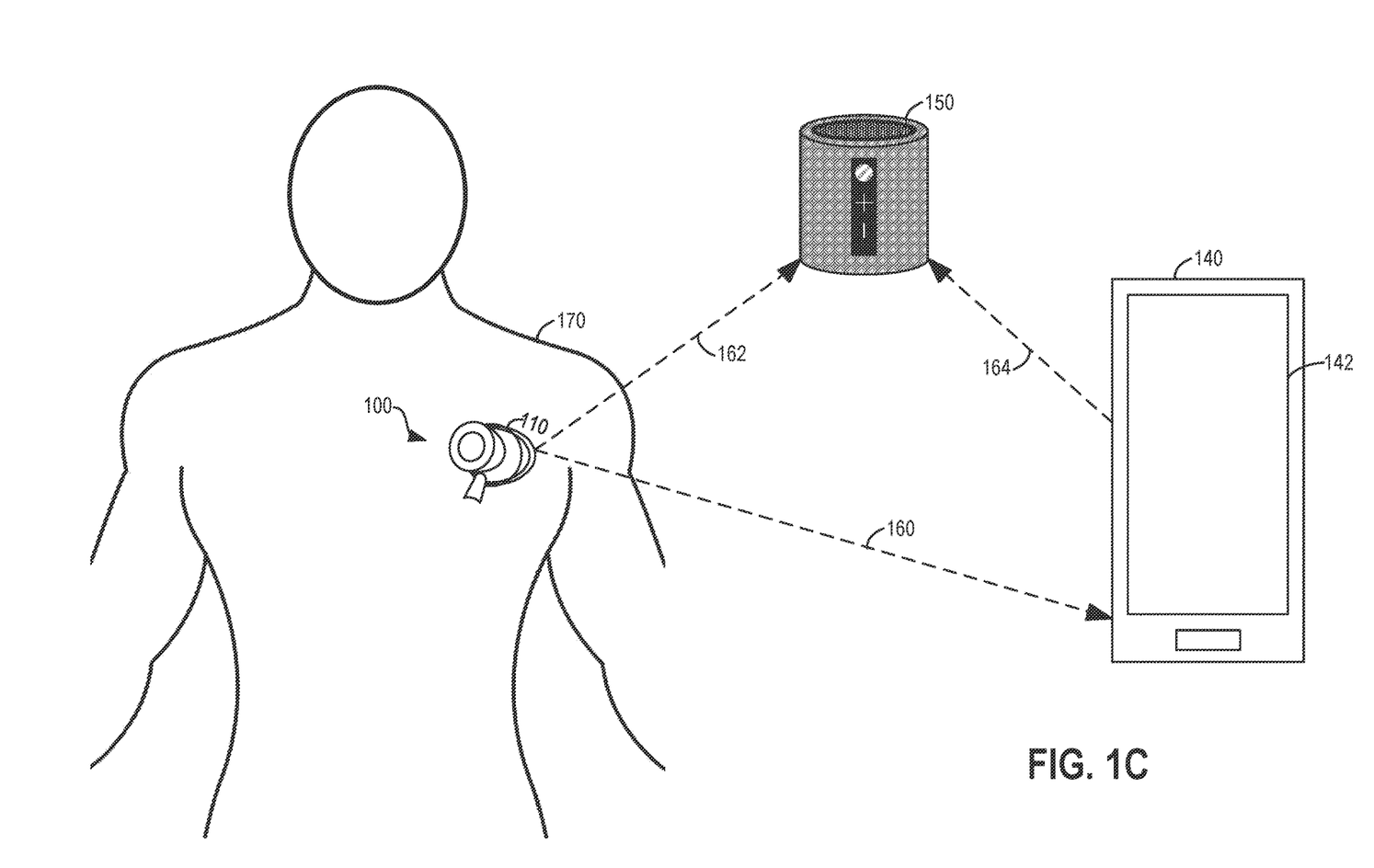
FIG. 1C schematically shows the electronic stethoscope in a second mechanical configuration, without the earpieces connected to the chestpiece.
Figure 2A:
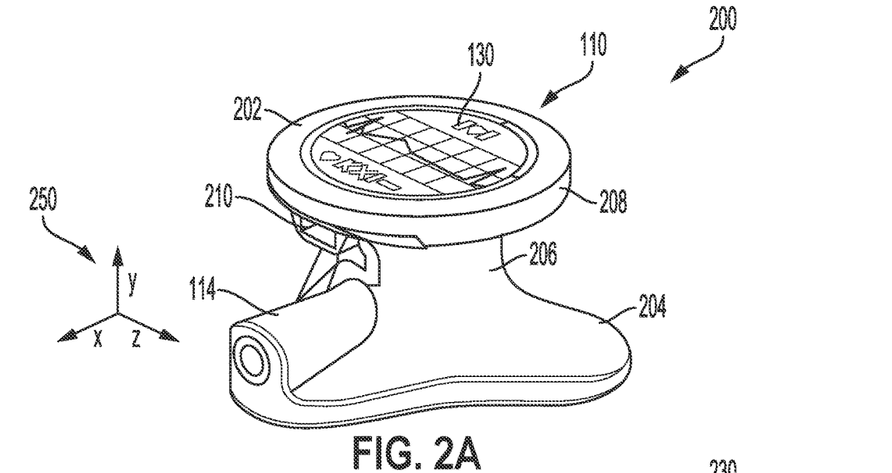
FIGS. 2A-2C show views of the chestpiece of the electronic stethoscope.
Figure 2B:
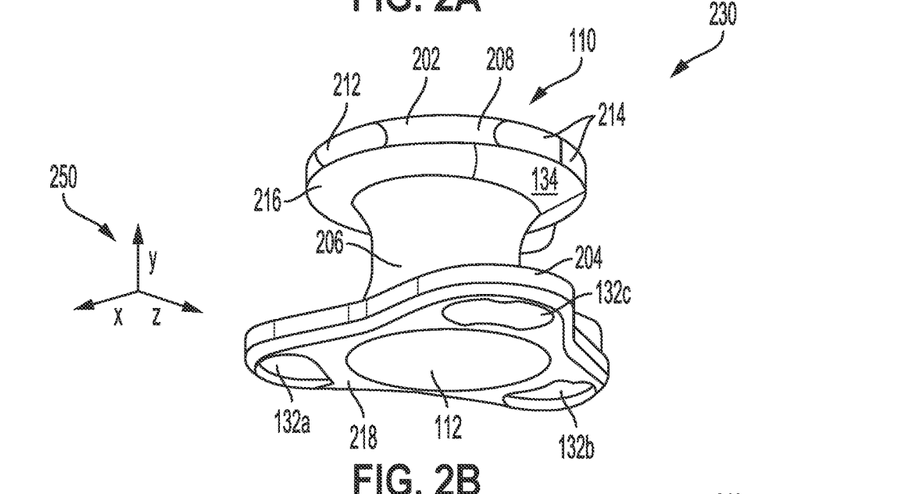
Figure 2C:
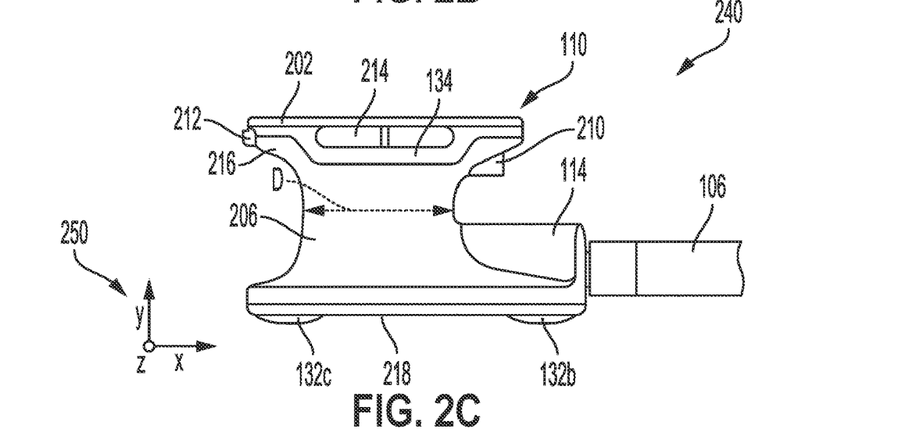

Turning now to the figures, FIGS. 1A-1C show an electronic stethoscope 100. Referring first to FIG. 1A, the electronic stethoscope 100 is shown in a first mechanical configuration. The electronic stethoscope 100 includes a chestpiece 110 and an output tube 106. The chestpiece 110 is in electronic communication with the output tube 106 through a connector 114 of the chestpiece. The output tube 106 includes earpieces 102 configured to be positioned in ears of a wearer to project recorded physiological sounds to the wearer. The output tube 106 and earpieces 102 may form a headset.

The chestpiece 110 may include a diaphragm 112, which is a sealed membrane with air inside that vibrates from external noises. The diaphragm 112 moves a volume of air inside the chestpiece 110 according to the vibrations caused by the external noises, which in turn creates sounds that may be recorded and transmitted through the connector 114 to the output tube 106. In some examples, the chestpiece 110 may include a bell in addition to the diaphragm 112. When included, the bell may be an open hollow cup or may include a smaller sealed membrane than the diaphragm 112, and air inside the bell may vibrate from external noises to produce acoustic pressure waves. The diaphragm 112 may be used for higher frequency auscultation, such as heart beats and breath sounds, while the bell may be used for lower frequency auscultation, such as heart murmurs and bowel sounds. The chestpiece 110 may be placed on a patient (e.g., subject) 170 by the patient 170 or by a clinician (not shown) for auscultation. The clinician or the patient 170 may listen to bodily sounds produced by the patient through the earpieces 102.

In some examples, the digital stethoscope includes one or more speakers to transmit amplified audio to a user's ears. The one or more speakers may be positioned in the chestpiece 110, in the output tube 106, or at the earpieces 102. Additional detail about the one or more speakers is provided below with respect to FIG. 1B.

The chestpiece 110 may connect to other electronic devices through wireless connections. For example, the chestpiece 110 may connect to an external computing device 140 through a first wireless connection 160. The external computing device 140 may be a mobile device, such as a smartphone, a tablet, a smartwatch, a laptop computer, or a personal digital assistant (PDA), for example. Alternatively, the external computing device 140 may be a stationary device, such as a desktop computer or server. In still other examples, the external computing device 140 may be included in a computing network, such as a cloud computing network. The external computing device 140 may include a processor operatively connected to memory (such as random-access memory, read-only memory, flash memory, a hard disk, etc.) as well as a communications interface for sending/receiving wired or wireless signals from a network and/or other computing devices, including the chestpiece 110. Further, the external computing device 140 includes a user interface 142, such as a display for outputting information to a user and one or more of a touchscreen, a trackball, hard keys/buttons, a keyboard, a mouse, and a trackpad for receiving user inputs. The external computing device 140 may operate a software application that receives the user inputs via the user interface 142 to adjust operation of the chestpiece 110. By connecting wirelessly to the external computing device 140, the chestpiece 110 may send audio data and analysis of the audio data to the external computing device 140.

As another example, the chestpiece 110 may connect to an external listening device 150 through a second wireless connection 162, and sounds recorded by the chestpiece 110 may be projected by the external listening device 150 for the patient 170 or the clinician to hear. The external listening device 150 may be a speaker, headphones, earbuds, hearing aids, or another device capable of projecting sound and forming wireless connections to other devices. In some examples, the external computing device 140 may connect to the external listening device 150 through a third wireless connection 164 instead of the chestpiece 110 connecting directly to the external listening device 150. In such examples, recorded sounds may be sent from the chestpiece 110 to the external computing device 140 and from the external computing device 140 to the external listening device 150.

As will be elaborated below with respect to FIG. 1B, the chestpiece 110 includes components for recording and sharing auscultations. Additionally, in some examples, the chestpiece 110 may include components for recording and sharing electronic signals of a heart (e.g., electrocardiogram signals). Further, as will be described with respect to FIG. 1C, in some examples, the chestpiece 110 may be disconnected from the output tube 106 and the earpieces 102.

Continuing to FIG. 1B, in some examples, the chestpiece 110 includes a body 111 that houses internal components, examples of which are elaborated below. The chestpiece 110 includes a computer processing unit (CPU) 116, such as a microcontroller unit (MCU), positioned within the body 111. The CPU 116 receives inputs and/or sends outputs to various electronic components that will be described further herein. In some examples, there is one microdevice that contains the CPU 116 and some or all of the electronic and electrical components. In some arrangements, the CPU 116 and the electronic and electrical components are positioned on two or more microdevices. The CPU 116 is operatively coupled to a memory 118, which includes one or more of a non-transitory (e.g., read-only) memory, a keep alive memory, and a random-access memory. For example, the CPU 116 is configured to access and execute instructions stored in the memory 118 according to one or more routines, examples of which will be described below with respect to FIGS. 3 and 4.

The chestpiece 110 may include an electronic acoustic modifier 120 in electrical communication with the CPU 116. In some examples, the electronic acoustic modifier 120 is a stand-alone device. In other examples, the electronic acoustic modifier 120 is firmware within the CPU 116. The electronic acoustic modifier 120 is configured to receive an auscultated electronic signal from a microphone 122 (e.g., the signal output by the microphone 122, which includes vibrations of the volume of air generated by the diaphragm during auscultation), modify the auscultated electronic signal to form a modified electronic signal (e.g., amplify the electronic signal), and transmit the modified electronic signal to one or more speakers 104 configured to convert the modified electronic signal to sound output.

The one or more speakers 104 may be positioned in the chestpiece 110, as shown. In such examples, the one or more speakers 104 may convert the electronic signal (e.g., received from the electronic acoustic modifier 120) to a sound output that is transmitted to a user's ears via the output tube 106 and earpieces 102. In other examples, the one or more speakers may be positioned elsewhere, such as within the output tube 106 or within the earpieces 102. Further, the speaker(s) 104 may be automatically powered on when the electronic stethoscope 100 is operated in an internal (e.g., wired) digital mode and automatically powered off when the electronic stethoscope 100 is operated in a wireless digital mode.

The chestpiece 110 includes an optional audio output connector 126, such as a headphone jack or USB-type port, which can receive the modified electronic signal from the electronic acoustic modifier 120. A user may physically connect a peripheral device to the audio output connector 126. Examples of such peripheral devices include but are not limited to a computer, a cell phone, and a listening device configured to convert the modified electronic signal to sound. The audio output connector 126 may also act as a charging port in order to charge battery 124 of chestpiece 110.

In some examples, a wireless transceiver 128 is positioned in the chestpiece 110, such as within the body 111, as shown. In some examples, the wireless transceiver 128 may be included in a circuit board, such as a printed circuit board (PCB), that may also include one or more electronic components, such as the microphone 122 and the CPU 116. The wireless transceiver 128 is in electrical communication with the electronic acoustic modifier 120. The wireless transceiver 128 is configured to receive the modified electronic signal from the electronic acoustic modifier 120, convert the modified electronic signal to a modified wireless signal, and wirelessly transmit the modified wireless signal from the chestpiece to an external listening device, such as the external listening device 150 shown in FIGS. 1A and 1C, and/or a peripheral device, such as external computing device 140 shown in FIGS. 1A and 1C. The wireless transceiver 128 may use any appropriate communication types and protocol, such as television, cellular phone, Wi-Fi, satellite, two-way radio, infrared, short-range microwave signals, IEEE 802.11 compliant radio signals, Bluetooth®, or Low Energy Bluetooth (BLE). In some examples, the wireless transceiver 128 may be configured to pair directly to the external listening device 150 and/or the external computing device 140. Alternatively, the wireless transceiver 128 may communicate data to the external listening device 150 and/or the external computing device 140 through an intermediary device, such as a wireless router maintaining a local area network (WLAN) or through a connection to the internet. The wireless transceiver 128 may also be configured to receive signals from one or more peripheral devices, including the external computing device 140 shown in FIGS. 1A and 1C. In some examples, the wireless transceiver 128 is in electrical communication with the microphone 122, and can wirelessly transmit the auscultated electronic signal to the external listening device 150 and/or the external computing device 140 without modification of the electronic signal via the electronic acoustic modifier 120. In some examples, the chestpiece 110 may include a second wireless transceiver that may thereby allow the chestpiece to establish two separate wireless connections with external devices. For example, the wireless transceiver 128 may connect to the external computing device 140 shown in FIGS. 1A and 1C while the second wireless transceiver connects to the external listening device 150 shown in FIGS. 1A and 1C.

It may be understood that sound may be projected via the speaker(s) 104 and also transmitted via the wireless transceiver 128 at the same time. For example, a user (e.g., a clinician or the patient 170) may listen to physiological sounds while placing the electronic stethoscope on the patient 170 via the earpieces 102 while one or more remote clinicians listen simultaneously via the external listening device 150.

As described above, the auscultated electronic signal or the modified electronic signal may be analyzed on the chestpiece 110 by the CPU 116. In some examples, the auscultated electronic signal or the modified electronic signal may be transmitted by the wireless transceiver 128 or through the audio output connector 126 to the external listening device 150 and/or the external computing device 140. Such signals can then be analyzed on the external computing device 140 to extract information about the condition of the patient or to suggest the preliminary diagnosis. The results of such an analysis can be transmitted back to the wireless transceiver 128 and can be communicated to a user of the electronic stethoscope 100 visually or with sound. Visual information can be provided using via a display screen 130 of the chestpiece 110 (which is described in more detail below with respect to FIG. 2A). Sound may be in the form of beeps, tones, or voice transmitted through the speakers 104 or the external listening device 150 (not shown in FIG. 1B). The external listening device 150 may be wireless headphones, a hearing aid, or a wireless speaker, for example, that is not included within the electronic stethoscope 100.

In some examples, the chestpiece 110 includes a second microphone facing the external environment. The second microphone is configured to detect audio from the external environment and to convert the audio into an electronic signal. In some examples, one or both of the microphone 122 and the second microphone is a micro-electrical-mechanical system (MEMS) microphone, an electret microphone, or a piezoelectric microphone. When such a second microphone is included in the chestpiece, the electronic acoustic modifier 120 is configured to receive the electronic noise signal from the second microphone and to use the electronic noise signal, for example, as part of active noise cancellation, in modifying the auscultated electronic signal to form the modified electronic signal.

In some examples, the second microphone can detect that the microphone 122 is recording sounds from "open air," such as when the chestpiece 110 is held against the air, by comparing the signals coming from the two microphones. If the signals are highly correlated, the sounds that would otherwise be transmitted to the speaker(s) 104 and/or the external listening device may be suppressed. This would prevent amplification of sounds when the chestpiece 110 is not on a patient and could prevent accidental exposure to undesirable amplified sounds from such things as sirens, speech, doors closing, etc. If the two microphones detect significantly different sounds, it is an indication that the chestpiece 110 may be on a surface intended to be auscultated, and amplification could be employed.

It should be understood that, in describing electrical communication, the phrase, "A is in electrical communication with B," describes both direct electrical communication from A and B or from B and A and also electrical communication that goes between A to B through the CPU 116, (e.g., from A to the CPU 116 to B and from B to the CPU 116 to A).

Chestpiece 110 further includes a battery 124. The battery 124 may be a disposable battery or a rechargeable battery. If the battery 124 is a disposable battery, the outside of the chestpiece may include a door (not shown) through which the battery 124 can be changed. If the battery 124 is a rechargeable battery, the outside of the chestpiece may include a charging port (as explained above) through which the battery 124 can be charged. Alternatively, the battery 124 may be charged wirelessly. The battery 124 is configured to supply power to the electronic components of the chestpiece, including, but not limited to, the microphone 122, the electronic acoustic modifier 120, the second microphone (when included), the speaker(s) 104, the CPU 116, the wireless transceiver 128, and the display screen 130.

Chestpiece 110 may also include one or more display outputs (not shown) positioned on an exterior of the chestpiece 110, such as indicator lights. In some examples, the display screen 130 configured to display text and/or images may also be included as a display output. The indicator lights and/or the display screen may provide information about the state of the electronic stethoscope 100 and/or provide information about the condition of the patient.

In some examples, the chestpiece 110 includes one or more devices to provide audio indicator signals (not shown) to provide sounds, such as beeps or verbal language, to indicate device operation status and/or information about the condition of the patient. In some examples, the volume of the audio indicator can be adjusted or turned off through user inputs.

In some examples, the body 111 of the chestpiece 110 may be connected to the output tube 106 shown in FIG. 1A via a connector 108 of the output tube 106 that is configured to be positioned within connector 114 of the chestpiece 110. In some examples, connector 108 and connector 114 may enable electrical connection between signal wires in the output tube 106 and the electrical components of the chestpiece 110 (e.g., the electronic acoustic modifier 120). In other examples, the connector 108 may facilitate an acoustic connection between speaker(s) 104 in the chestpiece 110 and the output tube 106 and earpieces 102. Thus, the connector 114 may house connector 108 in order to mechanically and acoustically couple the earpieces 102 to the chestpiece 110. The connector 108 may be integrated with (e.g., part of) the output tube 106 or may be a separate fitting.

In some examples, one or more feedback signals may be used to determine whether or not the output tube 106/earpieces 102 are physically connected to the chestpiece 110. For example, the CPU 116 may receive feedback from a component in the earpieces 102, such as a sensor and/or the speakers 104. For example, the sensor and/or the speakers 104 in the earpieces 102 may be selectively powered when the earpieces 102 are coupled to the body 111 via the connector 114 and connector 108, whereas electronic communication between the sensors and/or the speakers 104 and the chestpiece 110 is discontinued while the earpieces 102 are disconnected from the body 111. In another example, a switch or a proximity sensor may be used to determine whether or not the earpieces 102 are connected based on detecting that the connector 108 has been inserted within connector 114 or based a distance from the earpieces 102 from the chestpiece 110. In some examples, the CPU 116 may select an operating mode of the electronic stethoscope 100 based on whether the output tube 106 is connected to the chestpiece 110 (e.g., wireless only or wired) in order to adjust operation of the speakers 104 and/or electronic acoustic modifier 120.

The chestpiece 110 may include two or more electrodes 132 that may be used to obtain electrocardiogram (ECG) signals of the patient 170. The electrodes 132 are physically separated from one another to facilitate measurement of electrical signals on a patient's skin resulting from depolarization of the patient's heart muscle during each heartbeat, when appropriately positioned, e.g., against a patient's chest on the patient's left pectoral region. The chestpiece 110 may include an analog-to-digital converter to digitize voltage differentials measured by electrodes 132, as well as signal processing circuitry to filter and condition the detected signals. ECG signal processing circuitry may be implemented in the analog domain (e.g., prior to digitization), in the digital domain e.g., by CPU 116 and/or a dedicated digital signal processing integrated circuit), or both. The ECG signals obtained with the electrodes 132 may be sent to external computing device 140 via wireless transceiver 128.

The chestpiece 110 may further include a touch sensor 134 positioned inside the body 111 of the chestpiece 110 (e.g., proximate to an exterior of the chestpiece) or on an outer surface of the body 111 of the chestpiece 110. The touch sensor 134 may be a capacitive touch sensor comprised of one or more capacitive touch-sensing elements (e.g., one or more electrodes coupled to an insulating material) coupled to a measurement circuit configured to detect a touch input based on detecting capacitance generated by a human finger, for example, touching the capacitive touch-sensing element. Additionally or alternatively, the touch sensor 134 may be a resistive, impedance, or inductive touch sensor coupled to a measurement circuit configured to detect a touch input (e.g., contact or proximity). The output from the touch sensor 134 may be used to activate/power on the electronic stethoscope 100, as will be described in more detail below with respect to FIG. 3.

In some examples, the chestpiece 110 may include an accelerometer 136. The accelerometer 136 may comprise a three-axis accelerometer, which may provide information about the orientation and motion of the chestpiece 110. The accelerometer 136 may be rigidly affixed to a surface within the chestpiece 110 so that the accelerometer does not move independently from the chestpiece 110 as a whole. The accelerometer may be used to calculate an orientation of the chestpiece 110 when the chestpiece 110 is held stationary by a user. In some examples, the motion (or lack thereof) of the chestpiece 110 measured by the accelerometer 136 may be used to adjust the state of the electronic stethoscope, such as activating/powering on the electronic stethoscope when the accelerometer output indicates that the chestpiece 110 has been picked up by the user or by deactivating/powering off the electronic stethoscope when the accelerometer output indicates the chestpiece 110 has been stationary for a threshold duration.

Continuing now to FIG. 1C, the electronic stethoscope 100 is shown in a second mechanical configuration, wherein the connector 108 shown in FIG. 1B and the output tube 106 shown in FIG. 1A are mechanically and electrically disconnected from the chestpiece 110. For example, the output tube 106 (and the connector 108) may be removed from the electronic stethoscope 100 by a clinician (not shown) or the patient 170 in order to enable a wireless-only mode where no sound output is provided to the earpieces 102. In some examples, a cap may be inserted into the connector 114 in order to fully seal the chestpiece 110, rendering the chestpiece 110 waterproof. Alternatively, the cap may be an internal component of the chestpiece that automatically covers the connector 114 when the connector 108 is disconnected. For example, the cap may be a spring-loaded component that slides or rotates to a (fully) closed position to fully seal the connector 114, whereas the cap may be held in an open position when the connector 108 is attached to the chestpiece.

By removing the output tube 106 of electronic stethoscope 100, auscultation may be conducted wirelessly with more ease. For example, if the external listening device 150 is being used instead of earpieces 102 shown in FIG. 1A, the output tube 106 (and the connector 114 and the earpieces 102) may be removed to allow for ease of movement of electronic stethoscope 100 around and on a body of the patient 170. As described above, disconnecting the output tube 106 (e.g., via disconnecting the connector 114 shown in FIG. 1B) may automatically shut off electronic acoustic modifier 120 shown in FIG. 1B so that sound is no longer transmitted via the speaker(s) 104. Further, the output tube 106 may be re-attachable, and reconnecting the output tube 106 to the connector 114 may automatically activate the electronic acoustic modifier shown in FIG. 1B so that sound may be transmitted via the speaker(s) 104, as also described above with respect to FIG. 1B.

Turning now to FIGS. 2A-2C, magnified views of chestpiece 110 are shown. FIG. 2A shows a first view 200 of the chestpiece 110 (e.g., a top perspective view), FIG. 2B shows a second view 230 of the chestpiece 110 (e.g., a bottom perspective view), and FIG. 2C shows a third view 240 of the chestpiece 110 (e.g., a side view, specifically of a left side of the chestpiece 110), including the output tube 106 coupled to the chestpiece 110 via the connector 114 of the chestpiece and the corresponding connector 108 of the output tube 106. Each of FIGS. 2A-2C includes a Cartesian coordinate system 250 to orient the views. FIGS. 2A-2C are described collectively. FIGS. 2A-2C are shown to scale, though other relative dimensions may be used.

The chestpiece 110 is comprised of a top portion 202, a bottom portion 204, and a middle portion 206 coupled intermediate the top portion 202 and the bottom portion 204. The top portion 202 may be circular or have another suitable shape (e.g., oval, rectangular) and may include the display screen 130 on a top surface of the top portion 202. The top portion 202 may have an outer circumferential edge 208 extending downward from the display screen 130/top surface. The top portion 202 may further include a charging port 210 (which in some examples may also function as audio output connector 126) positioned on the outer circumferential edge 208.

In some examples, the chestpiece 110 includes one or more user interface buttons to receive user inputs, such as a power button 212 with which a user may power on/activate the connection between the battery 124 and the electronic components or power off/deactivate the connection between the battery 124 and the electronic components, and a volume control 214 for the microphone 122 (e.g., the volume control may control the amount of amplification performed by the electronic acoustic modifier 120 and thus control the volume output by the speaker(s) 104). In some examples, the chestpiece 110 includes a mode selection input button, which may be a button or switch that allows the user to initiate wireless auscultation (e.g., operation in the wireless digital mode) and/or obtain ECG signals by performing an action at the mode selection input button. For example, the user may depress or toggle the mode selection input button to a first position to initiate auscultation operation and depress or toggle the mode selection input button to a second, different position to initiate ECG operation.

In the example shown in FIGS. 2A-2C, the user interface buttons are arranged on the outer circumferential edge 208 of the top portion 202. The top portion 202 further includes a bottom surface 216 that extends from the outer circumferential edge 208 to the middle portion 206. The touch sensor 134 may be positioned at a suitable location (e.g., where a user is likely to grip) of the chestpiece 110, such as on or proximate to the bottom surface 216 (as shown), or on or proximate to the top portion 202 or the middle portion 206. The touch sensor 134 may include one or more touch-sensing elements that extend along a portion of the bottom surface 216. The touch sensor 134 may be configured to detect a touch input (e.g., finger(s) of a user) to the touch sensor 134 on any area of the touch sensor 134. The touch sensor 134 may extend along a suitable area of the bottom surface 216. For example, the bottom surface 216 may have a circumference where the bottom surface 216 meets the outer circumferential edge 208 and the touch sensor 134 may extend along 10% or more of the circumference, such as along 10-25% of the circumference. The touch sensor 134 may extend along the bottom surface 216 from the outer circumferential edge 208 to the middle portion 206.

In the example illustrated in FIG. 2B, the touch sensor 134 is positioned proximate the volume control 214 (e.g., the touch sensor 134 may extend on the bottom surface 216 directly below the volume control 214). Further, the top portion 202 may have a left side and a right side, defined relative to the connector 114, and the volume control 214 may be positioned on the left side. The left side of the bottom surface 216 of the top portion 202 of the chestpiece 110 may have a high likelihood of being touched by a user when the chestpiece 110 is in use during a patient exam. Thus, the touch sensor 134 is also positioned on the left side of the top portion 202 to maximize the likelihood the touch sensor 134 will detect that the chestpiece 110 is in use or is intended to be used. However, in other examples, the touch sensor 134 may be positioned elsewhere, such as on the right side of the bottom surface 216, on a top surface of the bottom portion 204, and/or on an outer surface of the middle portion 206. In some examples, more than one touch sensor may be included on the chestpiece 110. For example, a second touch sensor may be positioned on the right side of the bottom surface 216.

The bottom portion 204 may include a bottom surface 218 configured to be positioned against a patient during a patient exam to perform auscultation and/or obtain electrical signals of the heart (e.g., obtain ECG signals). The bottom surface 218 of the bottom portion 204 includes the diaphragm 112, which as shown in FIG. 2B is positioned in a center region of the bottom surface 218. The bottom surface 218 may further include electrodes 132 for obtaining ECG signals. In the example shown, three electrodes are included on the bottom surface 218: a first electrode 132a, a second electrode 132b, and a third electrode 132c. The bottom surface 218 may have circular shape like an acoustic stethoscope. Alternately, the bottom surface 218 may have a generally triangular shape and a respective electrode may be positioned at each corner of the bottom surface 218. However, other electrode configurations are possible without departing from the scope of this disclosure, such as more or fewer electrodes or different positioning of the electrodes on the bottom surface 218.

The top portion 202 and the bottom portion 204 each couple to the middle portion 206, which may have a smaller cross-sectional area than the top portion 202 or the bottom portion 204. For example, as shown in FIG. 2C, the middle portion 206 may taper inward from the top portion 202 until a narrowest diameter D of the middle portion 206 is reached (where the narrowest diameter D extends parallel to the x axis of the coordinate system 250), then the middle portion 206 may taper outward to the bottom portion 204. The middle portion 206 may be substantially cylindrical, such that the cross-sectional area of the middle portion 206 (along any part of the middle portion 206) may have a circular shape. The shape of the middle portion 206 (e.g., cylindrical with a narrowed diameter at an intermediate region of the middle portion 206) may be configured such that a user may place fingers around the middle portion 206 to hold the chestpiece 110 on a patient during a patient exam. The touch sensor 134 is positioned on the bottom surface 216 of the top portion 202 where the touch sensor 134 may receive touch input from the user's fingers while the chestpiece 110 is being held in place.

The connector 114 may extend upward (e.g., along the y axis of the coordinate system 250) from the bottom portion 204 and may extend outward (e.g., along the x axis of the coordinate system 250) from the middle portion 206. In FIG. 2C, the connector 114 is housing the corresponding connector of the output tube 106, and it is to be appreciated that the corresponding connector (e.g., connector 114) is hidden within the connector 108 in FIG. 2C and thus is not visible. When connected, audio data from the chestpiece 110 (e.g., as recorded by microphone 122) may be transmitted to speakers (e.g., speakers 104) coupled to the output tube 106 and the audio data may be projected to ears of the user.

Thus, the chestpiece shown in FIGS. 2A-2C includes a display screen and a touch sensor. At least in some examples, the display screen may not be touch sensitive. As such, the output from the touch sensor may be monitored by components of the chestpiece (e.g., the CPU 116) in order to activate or deactivate one or more electronic components of the chestpiece, such as the display screen as well as internal components of the chestpiece (e.g., the microphone(s), amplifier, wireless transceiver), as described in more detail below with respect to FIG. 3. The touch sensor may be positioned in a location where a user (e.g., a professional such as a physician or the patient) may grip the chestpiece. In some examples, the chestpiece includes a top portion, a bottom portion, and a middle portion positioned intermediate the top portion and the bottom portion. The bottom portion may include a diaphragm that produces vibrations in response to external noise/vibrations (e.g., physiological sounds such as heart sounds). The middle portion may have a smaller cross-sectional area than the top portion or the bottom portion, which may facilitate the user positioning their fingers around the middle portion when gripping the chestpiece in order to position and hold the chestpiece against the patient. In some examples, the touch sensor may be positioned based on where the user is likely to position their fingers relative to the chestpiece, such as on a bottom surface of the top portion, where the bottom surface faces a top surface of the bottom surface and surrounds a top circumferential edge of the middle portion (e.g., where the middle portion transitions to the top portion). In other examples, the touch sensor may be positioned partially or fully around the middle portion, on a top surface of the bottom portion, on the top surface of the top portion, or another suitable location. Further, more than one touch sensor may be included. In some examples, the chestpiece may not include a middle portion or top portion as described herein, but may instead include an elongate body that extends outward from the bottom portion (e.g., at an acute angle), where the body houses at least some of the electronic components described above (e.g., a wireless transceiver), and the touch sensor may be positioned on the top surface of the bottom portion (e.g., proximate to where the body extends from the bottom portion) or on the body. In still further examples, the chestpiece may not include a display screen and/or the chestpiece may include a bell in the top portion of the chestpiece, and the touch sensor may be positioned as described above (e.g., on the bottom surface of the top portion) or another suitable location (e.g., on the top surface of the top portion, on the middle portion, or on the top surface of the bottom portion). In this way, the touch sensor may be on or beneath a surface of the chestpiece that is likely to be touched when the chestpiece is used during a patient exam.

Figure 3:
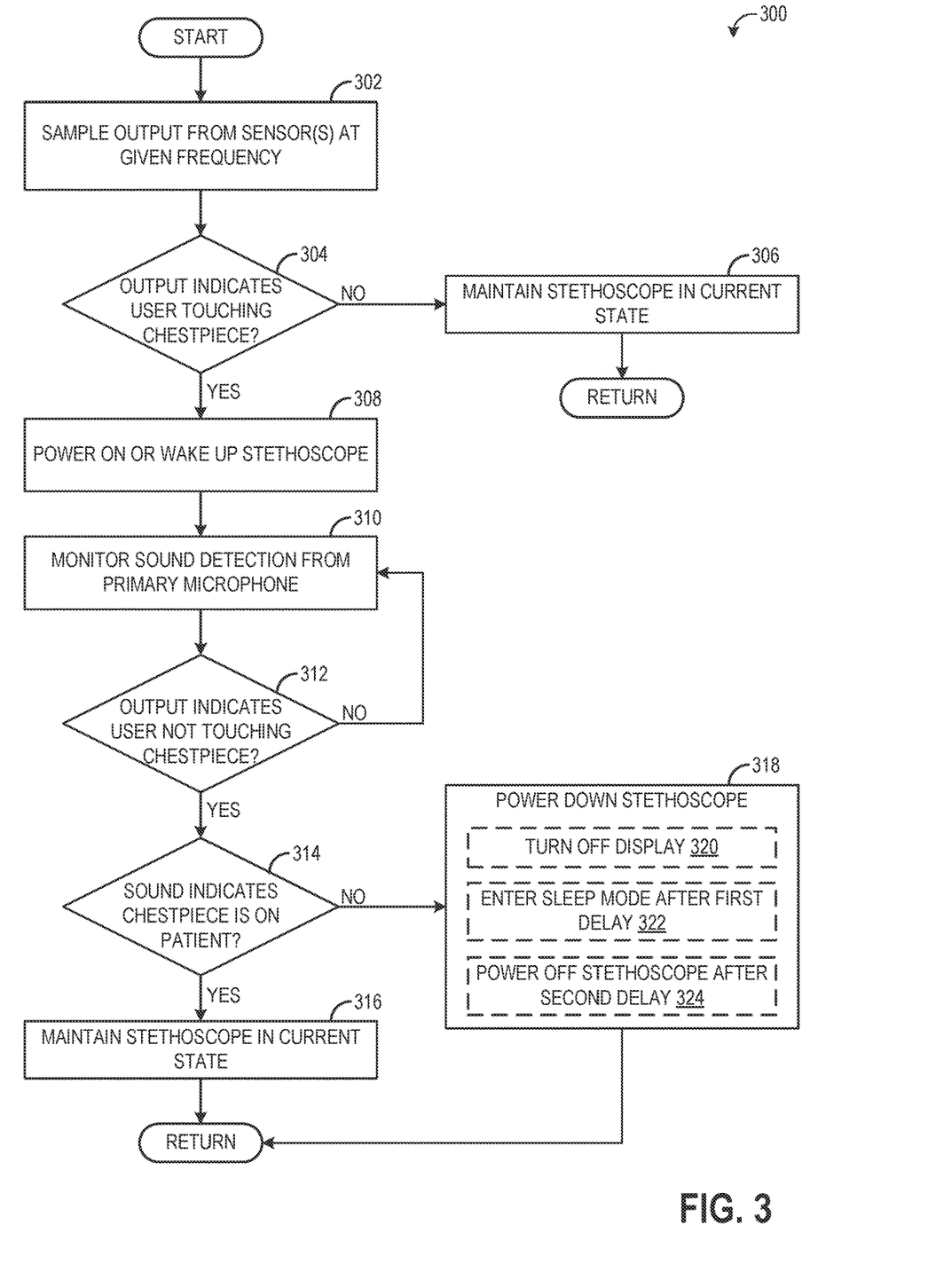
FIG. 3 is a method for powering on and off an electronic stethoscope based on sensor output.

Turning now to FIG. 3, a method 300 is shown for activating and deactivating an electronic stethoscope based on detected touch input. Instructions for carrying out the method 300 and the rest of the methods included herein may be executed by one or more processors, including a CPU of the electronic stethoscope (e.g., CPU 116 of FIG. 1B) based on instructions stored on a memory operatively coupled to each of the one or more processors (e.g., the memory 118 of FIG. 1B) and in conjunction with signals received from electronic components of the electronic stethoscope. In some examples, method 300 may be initiated when the electronic stethoscope is in a sleep mode, is powered off, or is otherwise deactivated. In such examples, at least some of the electronic components of the electronic stethoscope may not be supplied power from the battery when the electronic stethoscope is in the sleep mode, powered off, or is deactivated, such as the display screen, amplifier, wireless transceiver, etc.

At 302, method 300 includes sampling output from one or more sensors of the electronic stethoscope at a given frequency. The one or more sensors may include the touch sensor 134 of chestpiece 110, which may be a capacitive sensor, an inductive sensor, an impedance sensor, and/or a resistive sensor. In some examples, the one or more sensors may further include an accelerometer, such as accelerometer 136, and/or a diaphragm and microphone of the electronic stethoscope (e.g., diaphragm 112). To sample the output of the touch sensor, the touch sensor(s) may be charged and the output of the touch sensor (e.g., capacitance, inductance, impedance, and/or resistance of the touch sensor(s) measured with a measurement circuit, and the measured output may be sampled at the given frequency. The given frequency may be 1 Hz or greater, or another suitable frequency. The accelerometer may be configured to output a magnitude and/or direction of acceleration of the chestpiece at the given frequency. The diaphragm may cause a volume of air to vibrate (or not) based on whether the diaphragm is detecting sounds and/or whether a user has touched the diaphragm, which may be detected by a microphone (e.g., microphone 122).

At 304, method 300 includes determining if the output from the one or more sensors indicates that a user is touching the chestpiece of the electronic stethoscope. The user may be determined to be touching the chestpiece when the touch sensor(s) outputs a measured output value that is greater than a baseline output value, where the baseline output value is the output value of the touch sensor when exposed only to air (without a user touching the touch sensor). In some examples, the user may be determined to be touching the touch sensor when the touch sensor(s) outputs a measured value that has changed by at least a threshold amount relative to a previous measured value. Further still, the user may be determined to be touching the chestpiece when the microphone detects a sound (e.g., generated by the diaphragm) having a signature (e.g., frequency spectrum, amplitude) that is indicative of a user touching/tapping the diaphragm or having a signature that is indicative of a physiological sound (e.g., heart or lung sounds). In some examples, the user may be determined to be touching the chestpiece when the output from any of the touch sensor(s) or the diaphragm/microphone indicates the user is touching the chestpiece. In other examples, the user may be determined to be touching the chestpiece only when the output from two or more sensors indicates the user is touching the chestpiece. For example, if output from a touch sensor indicates the user is touching the chestpiece but the output from the accelerometer indicates the chestpiece has not been moved, the output from the sensors may not indicate that the chestpiece is being touched so that the chestpiece can be used for a patient exam. In contrast, if output from a touch sensor indicates the user is touching the chestpiece and the output from the accelerometer indicates the chestpiece has recently been moved or is being moved, the output from the sensors may indicate that the chestpiece is being touched so that the chestpiece can be used for a patient exam.

If the output indicates that the user is not touching the chestpiece (e.g., the measured output from the touch sensor is not above baseline output or the measured output has not changed by at least the threshold amount, or the microphone does not detect a sound indicative of a user touching the chestpiece), method 300 proceeds to 306 to maintain the stethoscope in its current state. For example, if the stethoscope is asleep or otherwise deactivated, the stethoscope may be maintained asleep or deactivated, as the sensor output does not indicate a user is touching the chestpiece in order to perform a patient exam and hence it is not determined that a user is intending to use the stethoscope to perform auscultation or measure a patient's ECG signals. Method 300 then returns.

If it is determined that the output from the sensor(s) indicates a user is touching the chestpiece to perform a patient exam, method 300 proceeds to 308 to power on or wake up the stethoscope. For example, if the stethoscope is currently in a sleep mode, the stethoscope may be woken up out of the sleep mode. If the stethoscope is fully deactivated, the stethoscope may be activated. In either example, the electronic components of the stethoscope that were previously not receiving power (such as the display screen, wireless transceiver, microphone, etc.) may be supplied power so that the microphone is enabled to detect sound, recorded sounds may be sent to the speakers and/or external devices such as an external computing devices, ECG signals can be obtained, etc.

At 310, the sound detected by the primary microphone (e.g., microphone 122) may be monitored. The primary microphone may be the microphone configured to detect the vibrations caused by movement of the diaphragm during a patient exam (e.g., physiological sounds such as heart sounds). The sound detected by the primary microphone may be monitored to determine if physiological sounds are being recorded by the primary microphone or if the primary microphone is recording non-physiological sounds, such as sounds from "open air." At 312, method 300 determines if the output from the sensor(s) indicates that the user is no longer touching the chestpiece. For example, the measured output from the touch sensor may have returned to baseline for at least a threshold duration (e.g., in a range of 10-30 seconds), indicating that the user is no longer holding a finger on the touch sensor and thus may no longer be touching the chestpiece. Likewise, the output from the accelerometer may indicate the chestpiece has not been moved for at least the threshold duration.

If the output does not indicate the user is no longer touching the chestpiece, for example if the measured output of the touch sensor indicates the user is still touching the touch sensor, method 300 returns to 310 to continue to monitor the sounds detected/recorded by the primary microphone. It is to be understood that once the stethoscope is activated and while the sounds detected/recorded by the primary microphone are monitored, the stethoscope may be used for auscultation or recording of other physiological sounds, ECG signal acquisition, audio signal and/or ECG signal analysis, etc., and that the display screen of the chestpiece may be activated and used to display information to the user, such as heart rate information.

If the output does indicate that the user is no longer touching the chestpiece (e.g., if the measured output of the touch sensor indicates the user is not touching the touch sensor), method 300 proceeds to 314 to determine if the monitored sounds from the primary microphone indicate that the chestpiece is still positioned on the patient. For example, if the monitored sounds indicate that the primary microphone is detecting/recording physiological sounds and not open air, the monitored sounds may indicate that the chestpiece is on the patient. On the other hand, if the monitored sounds indicate that the primary microphone is detecting/recording open air, the monitored sounds may indicate that the chestpiece is not on the patient.

If the monitored sounds indicate the chestpiece is on the patient, method 300 proceeds to 316 to maintain the stethoscope in its current state (e.g., activated and recording physiological sounds and optionally obtain ECG signals). In this way, even if the output from the touch sensor indicates the user is no longer touching the chestpiece, the stethoscope may remain activated to continue to record physiological sounds and optionally obtain ECG signals. By keeping the stethoscope activated while physiological sounds are detected, inadvertent deactivation of the stethoscope due to the user repositioning their fingers (e.g., such that the user is no longer touching the touch sensor but is still holding the chestpiece to the patient) or touch sensor error may be avoided. Method 300 then returns.

If the monitored sounds indicate the chestpiece is not on the patient, method 300 proceeds to 318 to power down the stethoscope. The lack of touch input to the sensor(s) (or movement of the chestpiece) coupled with the lack of detection of physiological sounds via the primary microphone may indicate the stethoscope is no longer in use, and thus the stethoscope may be powered down automatically (e.g., without a user actuating a mechanical power button, such as power button 212) to save battery life. Powering down the stethoscope may include turning off the display screen, as indicated at 320. The display screen may be turned off as soon as the output from the sensor(s) indicates the user is no longer touching the chestpiece and the lack of physiological sounds being detected is confirmed. In some examples, powering down the stethoscope may include entering a sleep mode after a first delay, as indicated at 322. The sleep mode may include turning off (e.g., stopping the supply of power to) one or more electronic components of the stethoscope in addition to the display screen while leaving other electronic components on and/or placing one or more electronic components of the stethoscope into a low-power consuming mode. For example, power supply to the electronic acoustic modifier may be interrupted while power supply to the wireless transceiver may be maintained to allow communication with the external computing device. Further, power supply to the touch sensor, microphone, and/or accelerometer may be maintained to allow detection of further touch input to the chestpiece and/or movement of the chestpiece. The electronic components powered down in the sleep mode may be components that may be quickly reactivated should the user touch the sensor(s) again. The stethoscope may be placed into the sleep mode at the same time as the display screen is turned off, or the stethoscope may be placed into the sleep mode after the display screen is turned off (e.g., 5-30 seconds after the display screen is turned off).

In some examples, powering down the stethoscope may include powering off the stethoscope after a second delay, as indicated at 324. The second delay may be longer than the first delay, such that the stethoscope may be fully powered off after a duration of time has elapsed following the entry into the sleep mode. When the stethoscope is powered off, the supply of power to all the electronic components may be stopped other than those components necessary to initiate reactivation of the stethoscope, such as the touch sensor and CPU. Method 300 then returns.

In some examples, when the stethoscope has been powered down based on the output from the sensor(s), the output from the touch sensor and one or more additional sensors are monitored while the stethoscope is powered down (e.g., method 300 may loop back to 302 to sample the output from the touch sensor and the additional sensors). The additional sensors may include the accelerometer in the chestpiece and/or the microphone. Responsive to the output from the accelerometer indicating that the electronic stethoscope has been stationary for a specified duration (e.g., longer than the first and second delays), the electronic stethoscope may be maintained deactivated even if the output from the touch sensor indicates a touch input has been received at the touch sensor. Then, at least in some examples, the stethoscope may be automatically reactivated responsive to the output from the accelerometer indicating the electronic stethoscope is being moved and responsive to the output from the touch sensor indicating a touch input has been received at the touch sensor. Using both touch sensor output and accelerometer output may prevent inadvertent reactivation of the stethoscope due to touch sensor error/high sensitivity and/or casual/inadvertent touch input (e.g., a user accidentally grazing the touch sensor when placing a hand near the stethoscope while the stethoscope is in the user's pocket or sitting on a table).

In this way, an electronic stethoscope such as electronic stethoscope 100 may be activated and deactivated based on touch input detected by one or more sensors positioned on or in the electronic stethoscope (e.g., on and/or in the chestpiece). As described previously, the sensor may be a touch sensor, such as a capacitive touch sensor, resistive sensor, impedance sensor, or inductive sensor. The touch input may be detected based on a value measured by/output by the sensor being greater than a baseline value. For example, a touch input may be detected when a capacitance measured by the touch sensor is above a baseline capacitance. In another example, when the sensor is an impedance sensor, one or more sub-systems of the electronic stethoscope may be turned on when the impedance sensor detects skin contact between electrodes of the sensor. In examples where the sensor is an accelerometer (in addition or alternative to the touch sensor), one or more sub-systems of the stethoscope may be turned on when the total magnitude or RMS of the acceleration measured by the three axes accelerometer is above a threshold (indicating movement). Analogously, the stethoscope may be turned off when the total magnitude or RMS of the acceleration measured by the three axes accelerometer stays below a threshold for a particular duration in time. In examples where the sensor is a microphone (in addition or alterative to the touch sensor and/or accelerometer), one or more sub-systems of the stethoscope may be turned on when the microphone picks up audio which is characteristic of body sounds. For example, a heart sound detector or lung sound detector may be executed on the internal CPU and the display, wireless transceiver, etc., may be activated when the heart and/or lung sound detector identifies that the stethoscope is picking up body sounds.

By relying on output from the one or more sensors to activate the stethoscope instead of or in addition to accelerometer data, for example, the stethoscope may only be activated when a user is actually touching the portion of the stethoscope that is required for performing a patient exam. In contrast, activating the stethoscope based on accelerometer output alone may result in activation of the stethoscope during periods where the stethoscope is not actually in use, such as when a user positions the stethoscope around their neck, moves about the environment with the stethoscope in a pocket or around their neck, etc., thereby using more battery charge than needed. Further, the stethoscope may also be deactivated based on the output from the sensor(s), e.g., when the output from the sensor(s) indicates the user is no longer touching the chestpiece. The stethoscope may be deactivated in a graduated manner, such that components that can be quickly reactivated are powered down first, and then if the output from the touch sensor still indicates the stethoscope is not being used, additional remaining components may be powered down. However, in other examples, once the output from the sensor(s) indicates the stethoscope is no longer being used, all the components of the stethoscope may be powered off at the substantially same time. Further, in some examples, when the electronic stethoscope has been powered off via the power button, the touch sensor(s), microphone, and/or accelerometer may be maintained on so that touch input and/or movement may be detected to reactivate the stethoscope. In other examples, when the electronic stethoscope has been powered off via the power button, the stethoscope may only be reactivated/powered on via input to the power button.

Figure 4:
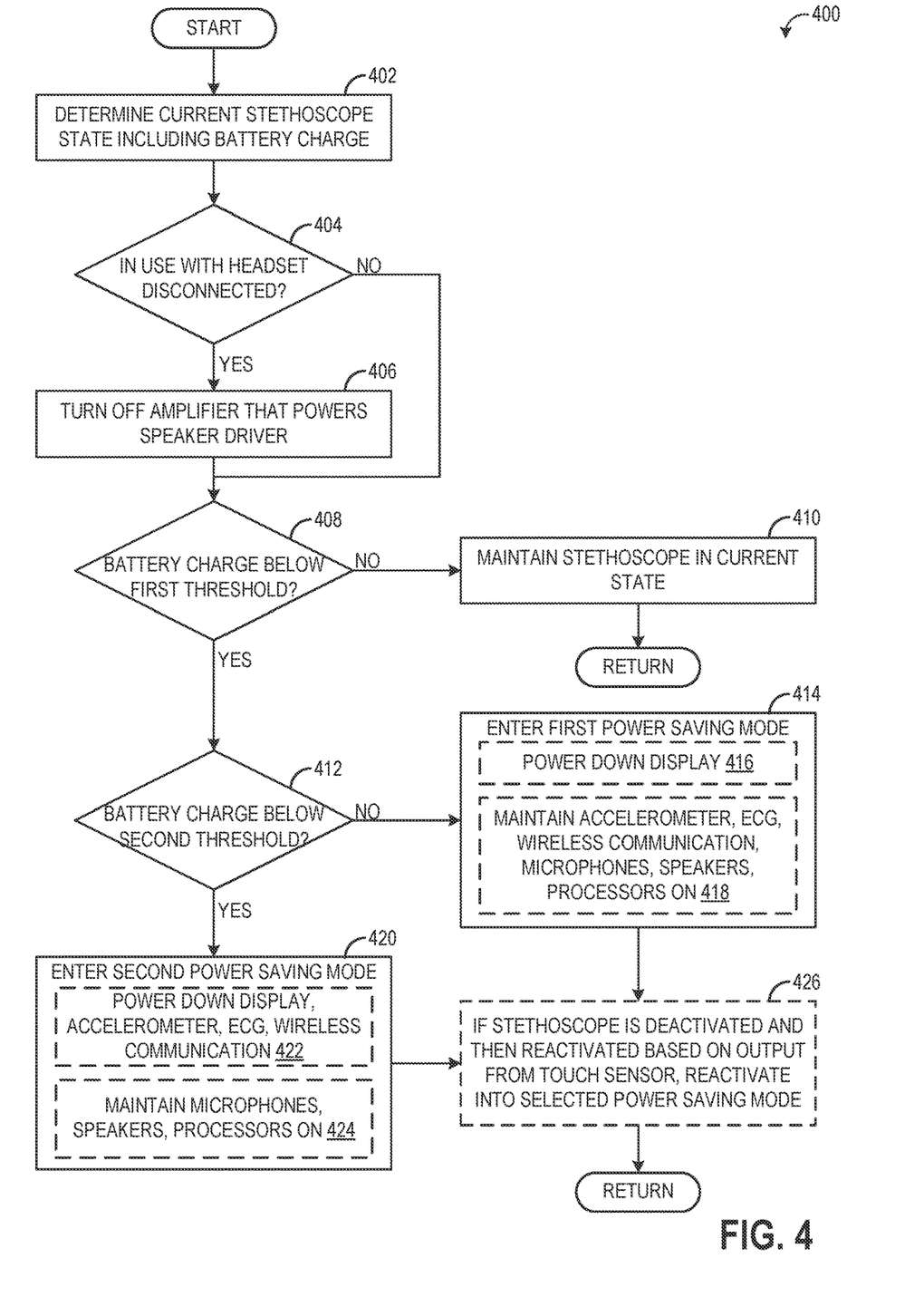
FIG. 4 is a method for managing power usage in an electronic stethoscope based on battery state of charge.

Referring now to FIG. 4, a method 400 for managing power usage in an electronic stethoscope is shown. Instructions for carrying out the method 400 may be executed by a processor of the electronic stethoscope (e.g., the CPU 116 of FIG. 1B) based on instructions stored on a memory operatively coupled to the processor (e.g., the memory 118 of FIG. 1B) and in conjunction with signals received from electronic components of the electronic stethoscope. In some examples, the method 400 may be performed in parallel to the method 300 of FIG. 3. Method 400 provides for entering one or more power savings mode based on battery charge, independent of the activation/deactivation of the stethoscope performed based on output from the touch sensor.

At 402, method 400 includes determining the current stethoscope state, including determining the current battery charge of the battery of the stethoscope. The current stethoscope state may include if the stethoscope is currently being used for auscultation and/or ECG, if the stethoscope is in a sleep mode, if the stethoscope is fully powered off, and/or one or more additional states (e.g., wireless only, wired). The battery charge may include the percentage of battery charge remaining in the battery of the stethoscope (e.g., battery 124). At 404, method 400 determines if the stethoscope state indicates the stethoscope is currently in use with the headset (e.g., output tube/earpieces) disconnected, also referred to herein as the wireless only mode of operation. If the stethoscope is not determined to be in use with the headset disconnected, method 400 proceeds to 408, which will be explained below.

If the stethoscope is determined to be in use with the headset disconnected, method 400 proceeds to 406 to turn off the amplifier that powers the speaker driver for the speaker(s) of the stethoscope (e.g., speakers 104). Because the headset is disconnected, audio output cannot be provided via the earpieces, so the amplifier (e.g., in the chestpiece) that amplifies the audio output (that would be sent to the speakers) is automatically powered off when it is detected that the headset has been disconnected, thereby saving battery charge.

At 408, method 400 determines if the current battery charge is below a first threshold charge. The first threshold charge may be a relatively low percentage of battery charge, such as in a range of 10-30% battery charge (such that only 10-30% of the full charge the battery is capable of holding remains). If the battery charge is not determined to be below the first threshold charge, method 400 proceeds to 410 to maintain the stethoscope in the current state, and then method 400 returns. When the battery charge is not below the first threshold charge, when the stethoscope is in use, the electronic stethoscope may be operated in a first mode. The first mode may include generating audio data via the microphone of the chestpiece; outputting the audio data via the one or more speakers of the stethoscope; optionally obtaining electrocardiogram (ECG signals) via ECG electrodes positioned on the chestpiece; outputting visual data for display on the display screen, the visual data generated based on the audio data and/or ECG signals; and optionally wirelessly transmitting, via a wireless transceiver of the chestpiece, one or more of the audio data and ECG signals to at least one external device (e.g., external computing device 140).

If the battery charge is determined to below the first threshold charge, method 400 proceeds to 412 to determine if the current battery charge is below a second threshold charge. The second threshold charge may be lower than the first threshold charge, such as in a range of 5-15% battery charge (such that only 5-15% of the full charge the battery is capable of holding remains). If the current battery charge is not below the second threshold (e.g., the current battery charge is between the first threshold charge and second threshold charge), method 400 proceeds to 414 to enter a first power saving mode. In the first power saving mode, one or more electronic components of the stethoscope may be powered off to save battery charge. The electronic components that are powered off in the first power saving mode may include components that are not necessary for auscultation. For example, the first power saving mode may include powering down/shutting off the display screen, as indicated at 416, while maintaining the accelerometer (e.g., accelerometer 188), ECG system (e.g., electrodes 132 and associated circuitry), wireless communication system (e.g., wireless transceiver 128), microphones (e.g., microphone 122), speakers (e.g., speakers 104), and processors (e.g., CPU 116) on, as indicated at 418. Thus, the display screen may be turned off, which minimizes total system power consumption. The microphones, microprocessors, and speakers still stay on so that the stethoscope can continue to function as an audio amplification device for extended periods. The other sensors (e.g., ECG, touch sensor) and wireless transmission also stay on so that the device can still be used for wireless auscultation and ECG.

Thus, when the battery charge is below the first threshold charge, when the stethoscope is in use, the electronic stethoscope may be operated in the first power saving mode, which may include generating audio data via the microphone of the chestpiece; outputting the audio data via the one or more speakers of the stethoscope (when the headset is connected); optionally obtaining electrocardiogram (ECG signals) via ECG electrodes positioned on the chestpiece; and optionally wirelessly transmitting, via a wireless transceiver of the chestpiece, one or more of the audio data and ECG signals to at least one external device (e.g., external computing device 140).

Returning to 412, if it is determined that the battery charge is below the second threshold charge, method 400 proceeds to 420 to enter a second power saving mode. In the second power saving mode, one or more electronic components of the stethoscope may be powered off to save battery charge, with more electronic components powered off than in the first power saving mode. For example, entering the second power saving mode may include powering down/turning off the display screen, accelerometer, ECG system, and wireless communication system, as indicated at 422, while maintaining the microphones, speakers, and processors on, as indicated at 424. In this way, the display, accelerometer, ECG system, and wireless transceiver are turned off, which minimizes total system power consumption. The microphones, microprocessors, and speakers still stay on so that the stethoscope can continue to function as an audio amplification device for extended periods. However, if the headset is not connected, the wireless communication system may remain powered on to enable recorded sounds to be communicated to an external device. Thus, when the battery charge is below the second threshold charge, when the stethoscope is in use, the electronic stethoscope may be operated in the second power saving mode, which may include continuing to generate audio data via the microphone and output the audio data via the one or more speakers; and automatically deactivating the ECG electrodes and wireless transceiver. In the second power saving mode, the touch sensor(s) may remain powered on to enable detection of touch inputs, or the touch sensor(s) may be deactivated to further save battery charge.

At 426, method 400 includes, if the stethoscope is deactivated and then reactivated based on output from the touch sensor (e.g., touch sensor 134), reactivating the stethoscope into the selected power saving mode. For example, the stethoscope may be deactivated once output from the touch sensor indicates that the stethoscope is not in use (e.g., a touch input has not been received at the touch sensor for a threshold duration and the sounds detected by the microphone indicate the stethoscope is not recording physiological sounds) and then the stethoscope may be reactivated in response to receiving a touch input at the touch sensor. When the touch sensor is reactivated after being deactivated, the stethoscope may continue to be operated in the power saving mode that the stethoscope was operating in at the time the stethoscope was deactivated (such as the first power saving mode or second power saving mode). In this way, when the stethoscope is powered on, the stethoscope may be operated in the current power saving mode until the battery charge is further depleted to below the second threshold (at which point the stethoscope may be operated in the second power saving mode instead of the first power saving mode) or until the stethoscope battery is charged to above the first threshold (at which point the stethoscope may be operated in the standard, non-power saving mode). Method 400 then ends.

Thus, method 400 provides for various power saving modes that may be applied in response to the state of the stethoscope (e.g., turning off the amplifier when the headset including the speakers is disconnected) and/or battery charge. In the example described above, the first power saving mode may be entered when the battery charge is below the first threshold charge but above the second threshold charge (e.g., in a range of 10-20% battery charge, for example). The first power saving mode may include turning off electronic components that are not high demand for delivering quality patient care, such as the chestpiece display screen. The electronic components for auscultation and ECG, as well as wireless communication, may remain on, which may allow the stethoscope to be used as needed for quality patient care while minimizing power usage to prolong the time until the battery is fully discharged. In particular, because wireless communication is still enabled, the information that may normally be displayed via the display screen (e.g., heart rate information) may still be displayed on an external computing device in communication with the stethoscope. The second power saving mode may be entered when the battery charge is particularly low (e.g., below 10% battery charge) and may include turning off additional electronic components to further minimize power usage. The additional components may include components for obtaining/analyzing ECG signals (e.g., ECG electrodes, accelerometer) and the wireless communication system. In doing so, the high demand components for performing auscultation may still be enabled (e.g., microphones, speakers) so that the stethoscope may still be used for amplifying physiological sounds.

While method 400 has been described above as including two different power saving modes that may be enabled based on the battery state of charge, it is to be appreciated that in some examples, only one power saving mode may be enabled once battery charge drops below a threshold charge. For example, the first power saving mode may be enabled once battery charge drops below the threshold charge (e.g., e.g., in a range of 10-20%) and may be maintained until the battery is charged to above the threshold charge. In another example, the second power saving mode may be enabled once battery charge drops below the threshold charge and may be maintained until the battery is charged to above the threshold charge In another representation, a method for power management of an electronic stethoscope includes automatically activating the electronic stethoscope based on output from a touch sensor positioned on an exterior of a chestpiece of the electronic stethoscope, including automatically activating a microphone, one or more speakers, and a display screen of the electronic stethoscope; determining that a battery charge of a battery of the chestpiece is below a threshold level and in response, automatically deactivating the display screen while maintaining the microphone and one or more speakers activated. In a first example of the method, the method further includes, after automatically activating the electronic stethoscope and before determining that the battery charge is below the threshold level, operating the electronic stethoscope in a first mode, including: generating audio data via the microphone; outputting the audio data via the one or more speakers; obtaining electrocardiogram (ECG signals) via ECG electrodes positioned on the chestpiece; outputting visual data for display on the display screen, the visual data generated based on the audio data and/or ECG signals; and wirelessly transmitting, via a wireless transceiver of the chestpiece, one or more of the audio data and ECG signals to at least one external device. In a second example of the method, optionally including the first example, the method further includes, responsive to determining that the battery charge is below the threshold level, operating the electronic stethoscope in a second mode, including: continuing to generate audio data via the microphone and output the audio data via the one or more speakers; and automatically deactivating the ECG electrodes and wireless transceiver.

The disclosure also provides support for an electronic stethoscope, comprising: a chestpiece configured to be positioned on a patient, the chestpiece including a sensor, wherein the chestpiece further includes a computing processing unit (CPU) operatively coupled to a memory storing instructions that, when executed by the CPU, cause the CPU to automatically activate the electronic stethoscope in response to detecting a touch input via the sensor. In a first example of the system, the sensor is a touch sensor. In a second example of the system, optionally including the first example, the touch sensor is positioned on or proximate to an exterior of the chestpiece. In a third example of the system, optionally including one or both of the first and second examples, the touch sensor is placed at a location on the chestpiece where a professional grips the chestpiece. In a fourth example of the system, optionally including one or more or each of the first through third examples, the sensor is an accelerometer. In a fifth example of the system, optionally including one or more or each of the first through fourth examples, the sensor is a microphone. In a sixth example of the system, optionally including one or more or each of the first through fifth examples, the chestpiece includes a display screen positioned on an exterior surface of the chestpiece. In a seventh example of the system, optionally including one or more or each of the first through sixth examples, the system further comprises: one or more speakers and a microphone, and wherein automatically activating the electronic stethoscope in response to detecting the touch input via the sensor comprises automatically activating the microphone and one or more speakers. In an eighth example of the system, optionally including one or more or each of the first through seventh examples, the memory stores further instructions that, when executed by the CPU, cause the CPU to automatically deactivate at least one electronic component of the electronic stethoscope in response to determining that a touch input has not been detected by the sensor for a threshold duration. In a ninth example of the system, optionally including one or more or each of the first through eighth examples, the instructions cause the CPU to automatically deactivate the electronic stethoscope in response to determining that a touch input has not been detected by the sensor for the threshold duration unless output from a microphone of the electronic stethoscope indicates the chestpiece is being used to record physiological sounds. In a tenth example of the system, optionally including one or more or each of the first through ninth examples, automatically deactivating at least one electronic component of the electronic stethoscope includes automatically deactivating a display screen positioned on the chestpiece. In a eleventh example of the system, optionally including one or more or each of the first through tenth examples, automatically deactivating at least one electronic component of the electronic stethoscope comprises automatically deactivating a first set of electronic components of the electronic stethoscope, and further comprising automatically deactivating a second set of electronic components of the electronic stethoscope responsive to output from the sensor indicating that a touch input has not been detected by the sensor for a second threshold duration, longer than the threshold duration. In a twelfth example of the system, optionally including one or more or each of the first through eleventh examples, the threshold duration is a first threshold duration, wherein the sensor is a touch sensor, and wherein the memory stores further instructions that, when executed by the CPU, cause the CPU to: after the electronic stethoscope has been automatically deactivated, continue to monitor output from the touch sensor and also monitor output from an accelerometer positioned in the chestpiece, responsive to the output from the accelerometer indicating the electronic stethoscope has been stationary for a second threshold duration, longer than the first threshold duration, maintain the electronic stethoscope deactivated even if the output from the touch sensor indicates a touch input has been received at the touch sensor, and responsive to the output from the accelerometer indicating the electronic stethoscope is being moved and responsive to the output from the sensor indicating a touch input has been received, automatically reactivate the electronic stethoscope.

The disclosure also provides support for a method for an electronic stethoscope, comprising: while the electronic stethoscope is deactivated, monitoring output from a touch sensor positioned on a chestpiece of the electronic stethoscope, and responsive to the output from the touch sensor indicating a touch input has been received at the touch sensor, automatically activating the electronic stethoscope. In a first example of the method, the method further comprises: while the electronic stethoscope is in use, continuing to monitor the output from the touch sensor, and responsive to the output from the touch sensor indicating that a touch input has not been received at the touch sensor for a threshold duration, automatically deactivating at least one electronic component of the electronic stethoscope. In a second example of the method, optionally including the first example, automatically deactivating at least one electronic component of the electronic stethoscope comprises automatically deactivating a first set of electronic components of the electronic stethoscope, and further comprising automatically deactivating a second set of electronic components of the electronic stethoscope responsive to output from the touch sensor indicating that a touch input has not been received at the touch sensor for a second threshold duration, longer than the threshold duration. In a third example of the method, optionally including one or both of the first and second examples, the threshold duration is a first threshold duration, and further comprising: after the electronic stethoscope has been automatically deactivated, continuing to monitor the output from the touch sensor and also monitoring output from an accelerometer positioned in the chestpiece, responsive to the output from the accelerometer indicating the electronic stethoscope has been stationary for a second threshold duration, longer than the first threshold duration, maintaining the electronic stethoscope deactivated even if the output from the touch sensor indicates a touch input has been received at the touch sensor, and responsive to the output from the accelerometer indicating the electronic stethoscope is being moved and the output from the touch sensor indicating a touch input has been received at the touch sensor, automatically reactivating the electronic stethoscope.

The disclosure also provides support for a method for power management of an electronic stethoscope, comprising: determining that a battery charge of a battery of the electronic stethoscope is below a threshold level and in response, automatically deactivating a display screen of the electronic stethoscope while maintaining a microphone and one or more speakers of the electronic stethoscope activated. In a first example of the method, the method further comprises: after automatically activating the electronic stethoscope and when the battery charge is above the threshold level, operating the electronic stethoscope in a first mode, including: generating audio data via the microphone, outputting the audio data via the one or more speakers, obtaining electrocardiogram (ECG) signals via ECG electrodes positioned on a chestpiece of the electronic stethoscope, outputting visual data for display on the display screen, the visual data generated based on the audio data and/or ECG signals, and wirelessly transmitting, via a wireless transceiver of the chestpiece, one or more of the audio data and ECG signals to at least one external device. In a second example of the method, optionally including the first example, the method further comprises, responsive to determining that the battery charge is below the threshold level, operating the electronic stethoscope in a second mode, including: continuing to generate audio data via the microphone and output the audio data via the one or more speakers, and automatically deactivating the ECG electrodes and wireless transceiver.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, and components referred to or indicated in this description, individually or collectively and any and all combinations or any two or more of the steps or features.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electronic stethoscope, comprising:
a chestpiece configured to be positioned on a patient, the chestpiece including a sensor, wherein the chestpiece further includes a computing processing unit (CPU) operatively coupled to a memory storing instructions that, when executed by the CPU, cause the CPU to:
automatically activate the electronic stethoscope in response to detecting a touch input via the sensor; and
automatically deactivate at least one electronic component of the electronic stethoscope in response to determining that a touch input has not been detected by the sensor for a threshold duration unless output from a microphone of the electronic stethoscope indicates the chestpiece is being used to record physiological sounds.

2. The electronic stethoscope of claim 1, wherein the sensor is a touch sensor.

3. The electronic stethoscope of claim 2, wherein the touch sensor is positioned on or proximate to an exterior of the chestpiece.

4. The electronic stethoscope of claim 2, wherein the touch sensor is placed at a location on the chestpiece where a professional grips the chestpiece.

5. The electronic stethoscope of claim 1, wherein the sensor is an accelerometer.

6. The electronic stethoscope of claim 1, wherein the sensor is a microphone.

7. The electronic stethoscope of claim 1, wherein the chestpiece includes a display screen positioned on an exterior surface of the chestpiece.

8. The electronic stethoscope of claim 1, further comprising one or more speakers and a microphone, and wherein automatically activating the electronic stethoscope in response to detecting the touch input via the sensor comprises automatically activating the microphone and one or more speakers.

9. The electronic stethoscope of claim 1, wherein automatically deactivating at least one electronic component of the electronic stethoscope includes automatically deactivating a display screen positioned on the chestpiece.

10. The electronic stethoscope of claim 1, wherein automatically deactivating at least one electronic component of the electronic stethoscope comprises automatically deactivating a first set of electronic components of the electronic stethoscope, and further comprising automatically deactivating a second set of electronic components of the electronic stethoscope responsive to output from the sensor indicating that a touch input has not been detected by the sensor for a second threshold duration, longer than the threshold duration.

11. The electronic stethoscope of claim 1, wherein the threshold duration is a first threshold duration, wherein the sensor is a touch sensor, and wherein the memory stores further instructions that, when executed by the CPU, cause the CPU to:
after the electronic stethoscope has been automatically deactivated, continue to monitor output from the touch sensor and also monitor output from an accelerometer positioned in the chestpiece;

responsive to the output from the accelerometer indicating the electronic stethoscope has been stationary for a second threshold duration, longer than the first threshold duration, maintain the electronic stethoscope deactivated even if the output from the touch sensor indicates a touch input has been received at the touch sensor; and responsive to the output from the accelerometer indicating the electronic stethoscope is being moved and responsive to the output from the sensor indicating a touch input has been received, automatically reactivate the electronic stethoscope.

12. A method for an electronic stethoscope, comprising:

while the electronic stethoscope is deactivated, monitoring output from a touch sensor positioned on a chestpiece of the electronic stethoscope;

responsive to the output from the touch sensor indicating a touch input has been received at the touch sensor, automatically activating the electronic stethoscope;

while the electronic stethoscope is in use, continuing to monitor the output from the touch sensor, and responsive to the output from the touch sensor indicating that another touch input has not been received at the touch sensor for a first threshold duration, automatically deactivating at least one electronic component of the electronic stethoscope;

after the electronic stethoscope has been automatically deactivated, continuing to monitor the output from the touch sensor and also monitoring output from an accelerometer positioned in the chestpiece;

responsive to the output from the accelerometer indicating the electronic stethoscope has been stationary for a second threshold duration, longer than the first threshold duration, maintaining the electronic stethoscope deactivated even if the output from the touch sensor indicates a touch input has been received at the touch sensor; and responsive to the output from the accelerometer indicating the electronic stethoscope is being moved and the output from the touch sensor indicating a touch input has been received at the touch sensor, automatically reactivating the electronic stethoscope.

13. The method of claim 12, wherein automatically deactivating at least one electronic component of the electronic stethoscope comprises automatically deactivating a first set of electronic components of the electronic stethoscope, and further comprising automatically deactivating a second set of electronic components of the electronic stethoscope responsive to output from the touch sensor indicating that a touch input has not been received at the touch sensor for a third threshold duration, longer than the first threshold duration.

14. A method for power management of an electronic stethoscope, comprising:

determining that a battery charge of a battery of the electronic stethoscope is below a threshold level and in response, automatically deactivating a display screen of the electronic stethoscope while maintaining a microphone and one or more speakers of the electronic stethoscope activated.

15. The method of claim 14, further comprising, after automatically activating the electronic stethoscope and when the battery charge is above the threshold level, operating the electronic stethoscope in a first mode, including:

generating audio data via the microphone;

outputting the audio data via the one or more speakers;

obtaining electrocardiogram (ECG) signals via ECG electrodes positioned on a chestpiece of the electronic stethoscope;

outputting visual data for display on the display screen, the visual data generated based on the audio data and/or ECG signals; and wirelessly transmitting, via a wireless transceiver of the chestpiece, one or more of the audio data and ECG signals to at least one external device.

16. The method of claim 15, further comprising, responsive to determining that the battery charge is below the threshold level, operating the electronic stethoscope in a second mode, including:

continuing to generate audio data via the microphone and output the audio data via the one or more speakers; and automatically deactivating the ECG electrodes and wireless transceiver.

* * * * *